(12) United States Patent
Chen

(10) Patent No.: US 11,112,621 B2
(45) Date of Patent: Sep. 7, 2021

(54) OPTICAL DEVICE WITH DESENSITIZED ROTATIONAL ANGULAR ALIGNMENT FOR ASTIGMATISM CORRECTION

(71) Applicant: Johnson & Johnson Vision Care, Inc., Jacksonville, FL (US)

(72) Inventor: Minghan Chen, St. Johns, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 128 days.

(21) Appl. No.: 16/278,815

(22) Filed: Feb. 19, 2019

(65) Prior Publication Data

US 2020/0264449 A1 Aug. 20, 2020

(51) Int. Cl.
*G02C 7/04* (2006.01)

(52) U.S. Cl.
CPC .................. *G02C 7/048* (2013.01)

(58) Field of Classification Search
CPC .................. G02C 7/04; G02C 7/048
USPC ............ 351/159.19, 159.21, 159.36, 159.38, 351/159.54, 159.72
See application file for complete search history.

(56) References Cited

U.S. PATENT DOCUMENTS

| 8,690,320 B2 | 4/2014 | Stupplebeen et al. |
| 2012/0194778 A1* | 8/2012 | Skudder ............... G02C 7/048 351/159.21 |
| 2018/0011342 A1* | 1/2018 | Hovinga ............... G02C 7/044 |

FOREIGN PATENT DOCUMENTS

| AU | 199664492 | 11/1996 |
| EP | 0745876 | 4/2014 |

* cited by examiner

*Primary Examiner* — Darryl J Collins

(57) ABSTRACT

An ophthalmic lens comprises a main body having a toric surface and a spherical surface opposite the toric surface, the main body comprising an eyelid stabilization design structure having a thickness of less than 200 μm, wherein the spherical surface is configured to exhibit a lens spherical power, wherein the toric surface is configured to exhibit a lens cylindrical power that does not fully correct ocular cylindrical power due to astigmatism; and wherein the lens spherical power is configured such that the minimum circle of the ophthalmic lens is on or adjacent the retina of the eye of the wearer at a target angle of alignment.

22 Claims, 5 Drawing Sheets

ESD zone

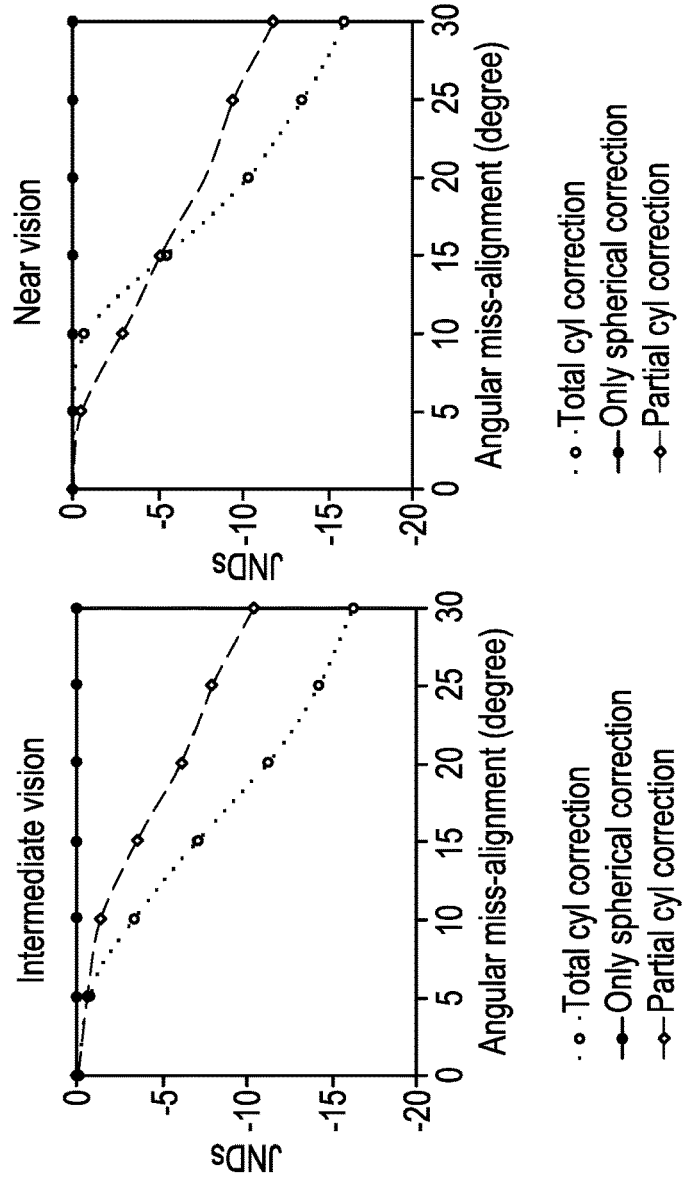

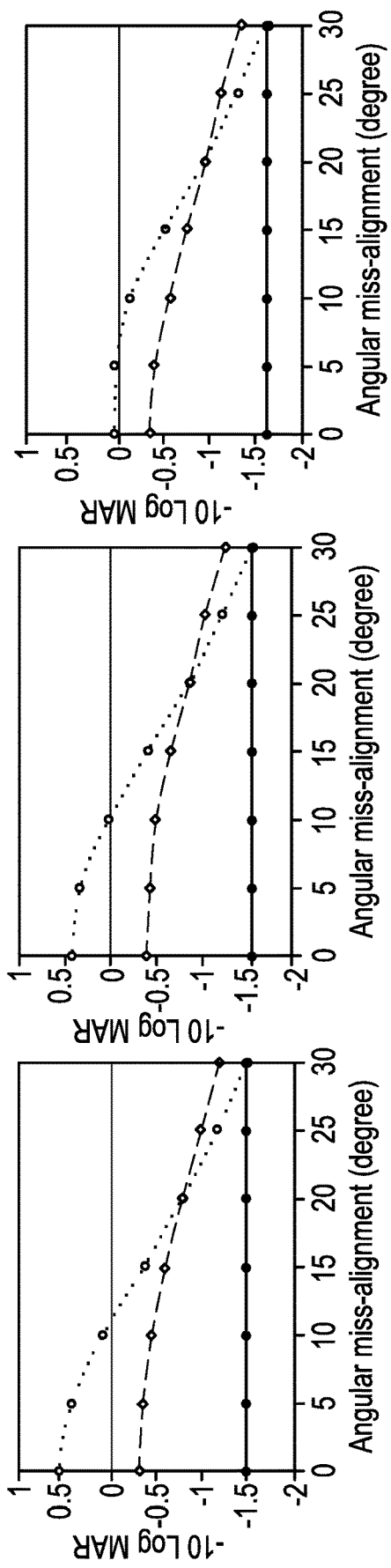

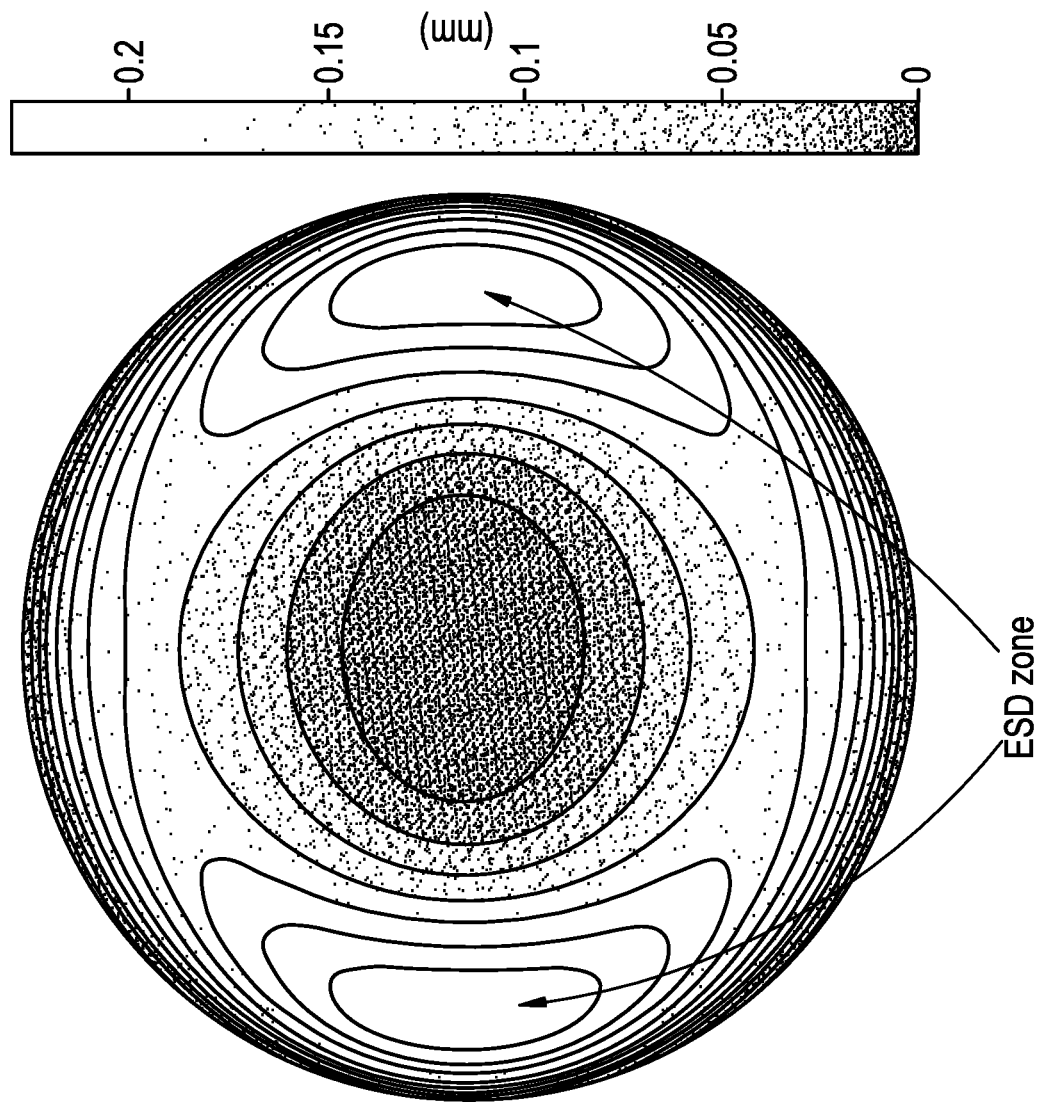

OPTICAL DEVICE WITH DESENSITIZED ROTATIONAL ANGULAR ALIGNMENT FOR ASTIGMATISM CORRECTION

BACKGROUND OF THE DISCLOSURE

1. Field of the Disclosure

The present disclosure relates to ophthalmic devices, such as wearable lenses, including contact lenses, scleral lens, RGP lens, implantable lenses, including inlays and onlays and any other type of device comprising optical components, and more particularly, to ophthalmic devices and methods for designing ophthalmic devices with desensitized rotational angular alignment for astigmatism correction.

2. Discussion of the Related Art

Astigmatism is a type of refractive error in which the eye does not focus light symmetrically on the retina and significantly degrades the patient's retinal image quality and therefore their perceived quality of vision. Symptoms may depend on the degree of astigmatism. Besides an asymmetric blurring of the image, higher degrees of astigmatism may cause symptoms such as squinting, eye strain, fatigue, or even headaches. Astigmatism in the eye can originate from asymmetries about the optical axis of both the cornea and the crystalline lens. Currently, a contact lens with cylindrical power is employed to correct astigmatism.

By its very nature, the correction of astigmatism requires a non-rotationally symmetric optical element. In particular, the degree to which the astigmatism of the eye can be corrected is a function of, among other things, the angular alignment between the azimuthal orientation of the eye's aberration and the orientation of the correcting lens.

Thus, improvements are needed.

SUMMARY OF THE DISCLOSURE

The present disclosure relates to ophthalmic lenses and methods that are less sensitive to the angular alignment between the azimuthal orientation of the eye's aberration and the orientation of the correcting lens, as compared to conventional "toric" products. As an example, ophthalmic lenses and methods may comprise attributes of desensitizing the performance of an astigmatism-correcting contact lens with respect to its angular position on the eye.

An ophthalmic lens may comprise a main body having a toric surface and a spherical surface opposite the toric surface, the main body comprising an eyelid stabilization design structure having a thickness of less than 200 μm (e.g., thickness difference of less than 200 μm), wherein the spherical surface is configured to exhibit a lens spherical power, wherein the toric surface is configured to exhibit a lens cylindrical power that does not fully correct ocular cylindrical power due to astigmatism; and wherein the lens spherical power is configured such that the minimum circle of the ophthalmic lens is on or adjacent the retina of the eye of the wearer at a target angle of alignment.

An ophthalmic lens may comprise a main body having a toric surface and a spherical surface opposite the toric surface, wherein the spherical surface is configured to exhibit a lens spherical power, wherein the toric surface is configured to exhibit a lens cylindrical power based on at least an astigmatism direction of the eye of the wearer and a target cylindrical power that would result in substantially full cylindrical correction, wherein the cylindrical power is less than the target cylindrical power, and wherein the lens spherical power is configured such that the minimum circle of the ophthalmic lens is on or adjacent the retina of the eye of the wearer at a target angle of alignment.

An ophthalmic lens may comprise a main body having a toric surface and a spherical surface opposite the toric surface, wherein the spherical surface is configured to exhibit a lens spherical power, wherein the toric surface is configured to exhibit a lens cylindrical power that does not fully correct ocular cylindrical power due to astigmatism; and wherein the lens spherical power is configured such that the minimum circle of the ophthalmic lens is on or adjacent the retina of the eye of the wearer.

BRIEF DESCRIPTION OF THE DRAWINGS

The foregoing and other features and advantages of the disclosure will be apparent from the following, more particular description of preferred embodiments of the disclosure, as illustrated in the accompanying drawings.

FIGS. 2A-2C are plots of comparisons of JNDs variations of a conventional toric lens and a lens with angular desensitized design in accordance with aspects of the present disclosure.

FIGS. 3A-3C are plots of on-eye visual performance of three lenses (conventional toric lens; new example toric lens of the present disclosure; and conventional spherical lens) for patients with Rx=−3D and cyl=−1.25D.

FIG. 5 shows the front surface sag profile after subtracting the best fitting sphere. The arrow indicates the ESD region.

DETAILED DESCRIPTION

Introduction:

An ophthalmic device such as a toric soft contact lens may comprise a back surface that includes a cylinder correction along the direction of astigmatism. If the cylindrical direction of the lens is aligned with the ocular cylindrical power direction, an efficient wavefront aberration correction is achieved and patients may experience desirable retina image quality. However, on the patient's eye, lens rotation and decentration happen frequently due to factors such as blinking, for example. Lens rotational misalignment may introduce significant amount of residual cylindrical power. As show in the equation below, the residual cylinder power is proportional to the SIN function of the misalignment angle. For example, with 30 degree of angular misalignment, the residual cylindrical power is equal to the original ocular cylindrical power and thus it may not be necessary to correct it.

$$R = 2C \sin(\theta)$$

Accordingly, a rotational desensitized optical design in accordance with aspects of the present disclosure offer not only better lens correction but also potential mechanical freedom to improve lens comfort. Currently, lens orientation stability is controlled, for example, by an eyelid stabilization design (ESD) structure (e.g., ballasts) or advanced stabilization design (ASD). Typically, a better lens rotational stability lens means a larger thickness difference (TD, along azimuth angle at lens peripheral region) is required (e.g., 330-390 μm). TD or ESD thickness may be defined as the front sag difference between the maximum and minimum sag values points which are at the same radius position along azimuthal direction. Larger TD structure may degrade lens comfort performance. With desensitized optics, in accordance with the present disclosure, a better lens rotation tolerance is allowed and thus TD can be further reduced (e.g., 200-300 μm or <200 μm ESD thickness). With reduced TD, a lens with improved comfort may be achieved.

Figure 1:
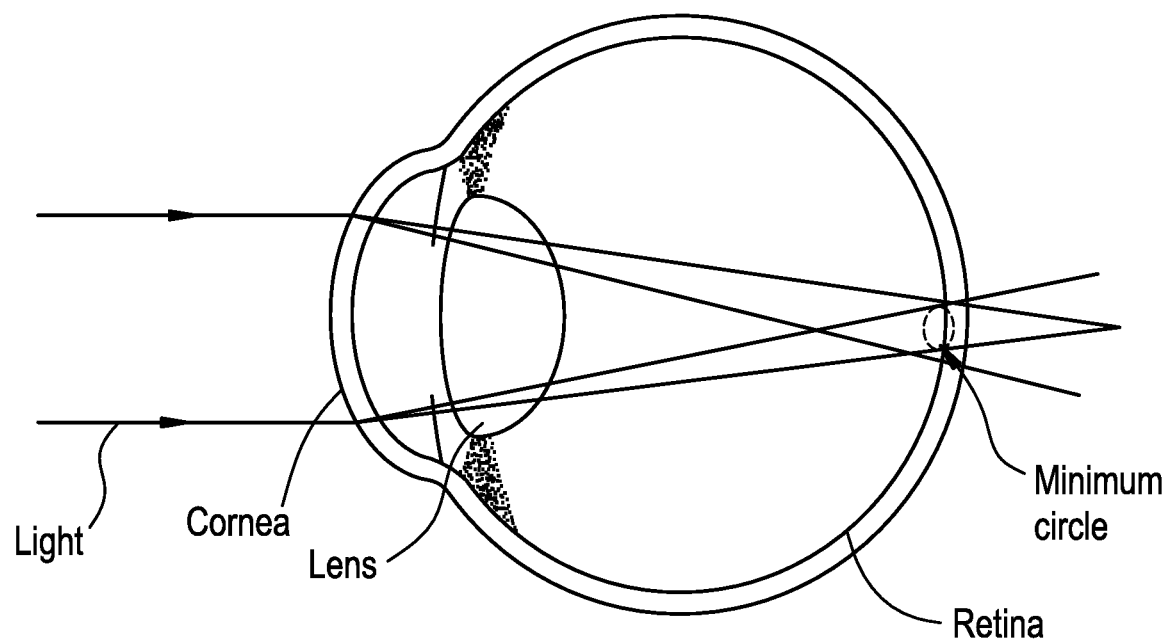
FIG. 1 is a schematic of an example eye and ray diagram showing a minimum circle is a desirable imaging position when the overall system has certain amount of astigmatism.

Optical Lens Design, Visual Simulation and its Application:

FIG. 1 shows the basic theory behind the desensitized rotational angle lens design. For an ocular system with cylindrical power, there are two line foci along the optical propagation path due to the astigmatism wavefront aberration. In order to achieve desirable visual correction performance, one may fully correct all the cylindrical power in the system. However, if cylindrical power is only partially corrected (e.g., not fully corrected), one may adjust spherical power such that the minimal/minimum circle is on or adjacent a surface of the patient's retina, thereby achieving/maintaining a desired or target visual performance.

The visual fluctuations are also compared with conventional toric lenses using just noticeable difference (JND) as a visual performance metric, as shown in FIGS. 2A-2B. Obviously, there is no JND variation for spherical lens in response to lens rotational misalignment. But, as illustrated, the designed lens in accordance with the present disclosure has better stability compared to conventional toric lenses due to at least its angular desensitized optical design.

FIGS. 3A-3B show a comparison of the visual acuity variation in response to lens rotational misalignment off a conventional toric lens, a toric lens design with rotation desensitized optics in accordance with aspects of the present disclosure, and a conventional equivalent spherical lens. As shown, the x-axis is the lens rotational misalignment angle and y-axis is patient visual acuity (−10 Log(MAR)). Visual acuities were simulated at far, intermediate (1D) and near (2D) positions with a modelled Rx=−3D and Cyl=−1.25D patient. Without rotational misalignment, the example lens of the present disclosure performed worse than the conventional toric lens by 3 letters but better than sphere lens by ~1 line. However, with rotational misalignment, the benefit of the designed lens in accordance with the present disclosure performs better than the conventional toric lens. Comparing with a conventional toric lens, the designed lens is accordance with the present disclosure has better VA performance once the misalignment angle is larger than ~20 degree. Moreover, the example lens of the present disclosure achieves this performance while reducing lens thickness and improving comfort. As an example, a lens in accordance with the present disclosure may comprise ESD structure having thickness less than 200 μm. As an example, FIG. 5 shows the front surface sag profile after subtracting the best fitting sphere. The arrow indicates an example ESD region.

It is also important to know that the angular tolerance is tunable depending on the amount of the toric which is partially corrected or is not corrected by the soft contact lens. Typically, with less toric power treated by the lens, the lens will show better angular misalignment tolerance. However, at the same time, the lens will lose more peak performance (the visual correction performance without any rotational misalignment).

Managing lens misalignment with ESD may also have tradeoffs. For example, the less ESD (e.g., lens thickness due to ESD), the higher the chance for lens misalignment due to orientation change. Thus, lenses in accordance with aspects of the present disclosure may provide design freedom with astigmatism correction using a thinner ESD structure and/or reduced overall thickness difference. Lenses of the present disclosure may be optimized based on orientation of the cylindrical correction and the direction of astigmatism. As an example, lenses may be configured for the correct cylindrical alignment or may be configured based on an alignment/misalignment angle relative to an axis parallel to the direction of astigmatism. The alignment angle may be between 0 and 30 degrees, between 10 and 30 degrees, or between 20 and 30 degrees, for example. Other ranges or endpoints may be used. The alignment angle at which the lens is configured may be at least 20 degrees for example. Other threshold angles for optimization may be used.

Figure 4A:
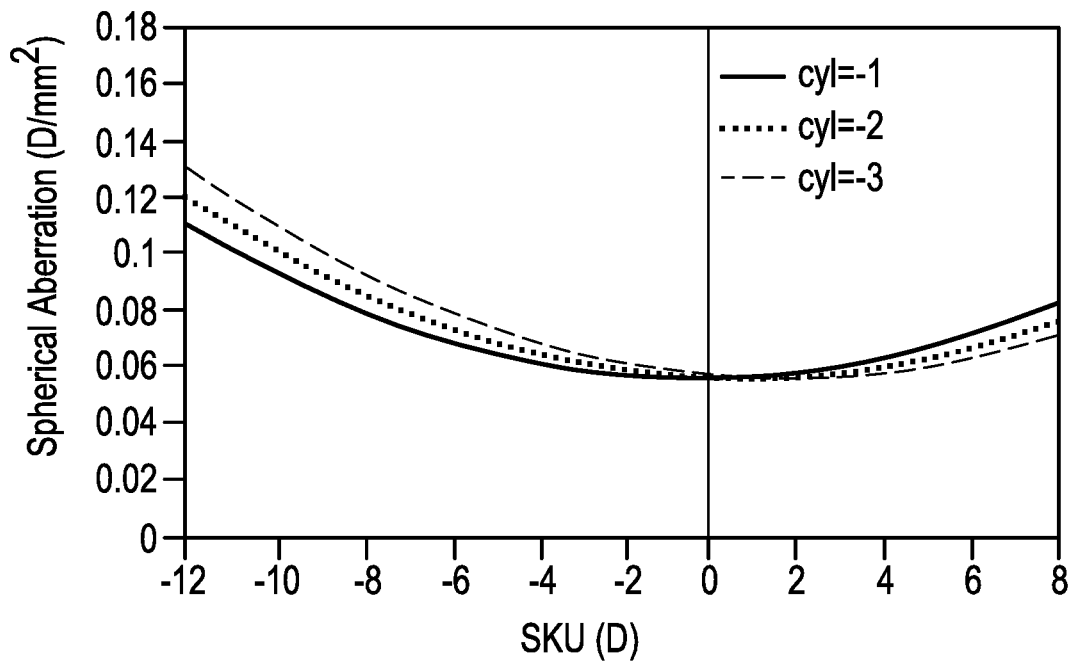
FIG. 4A-4B shows plots of spherical aberration (SPHA) of a toric eye along both toric meridian (a) and non-toric/spherical meridian (b) respectively across spherical power range (−12~+8D). As shown, along toric meridian (4A), multiple SPHA was plotted for patients with −1, −2 and −3 cylinder power.
Figure 4B:
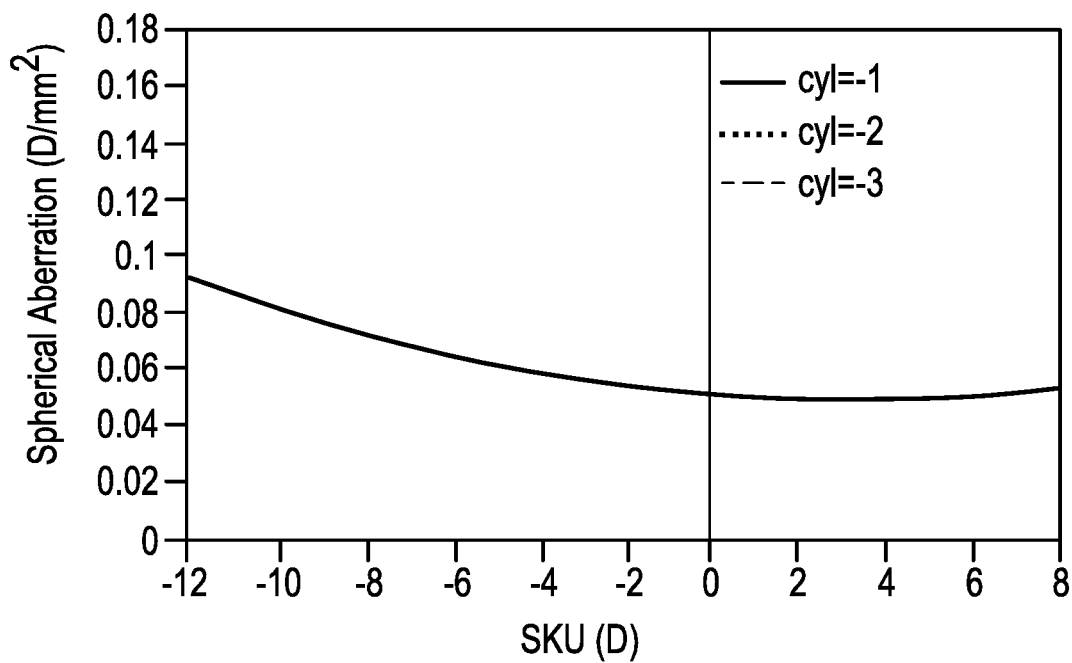

The lenses may be tuned using less than full correction in the cylindrical power and adjustment to the spherical power such that the minimal/minimum circle is on or adjacent a surface of the patient's retina, thereby achieving/maintaining a desired or target visual performance. The lenses may be tuned using less than full correction in the cylindrical power and adjustment to the spherical power to minimize wave front aberration or to minimize spherical aberration at any given alignment/misalignment angle. For illustration, FIG. 4 shows the spherical aberration (SPHA) of a toric eye along both toric meridian (a) and non-toric/spherical meridian (b) respectively across spherical power range (−12~+8D). Along toric meridian, multiple SPHA was plotted for patients with −1, −2 and −3 cylinder power. Using such information, optical power may be configured to minimize spherical aberration at a given angle of alignment relative to an axis parallel to the direction of astigmatism.

What is claimed is:

1. An ophthalmic lens to be worn on an eye of a patient, comprising: a main body having a toric surface and a spherical surface opposite the toric surface, the main body comprising an eyelid stabilization design structure having a thickness of less than 200 μm, wherein the spherical surface is configured to exhibit a lens spherical power, wherein the toric surface is configured to exhibit a lens cylindrical power that is less than a target cylinder power that would result in substantially full cylinder correction for said patient; and wherein the lens spherical power is configured such that a minimum circle of the ophthalmic lens is on or adjacent the retina of the eye of the patient at a target angle of alignment.

2. The ophthalmic lens of claim 1, wherein the toric surface is a back surface of the main body configured to be disposed on the eye of the patient.

3. The ophthalmic lens of claim 1, wherein the spherical surface is a back surface of the main body configured to be disposed on the eye of the patient.

4. The ophthalmic lens of claim 1, wherein the target angle of alignment is between 0 and 30 degrees measured from an axis parallel to a direction of the astigmatism.

5. The ophthalmic lens of claim 1, wherein the target angle of alignment is between 10 and 30 degrees measured from an axis parallel to a direction of the astigmatism.

6. The ophthalmic lens of claim 1, wherein the target angle of alignment is between 20 and 30 degrees measured from an axis parallel to a direction of the astigmatism.

7. The ophthalmic lens of claim 1, wherein the target angle of alignment is at least 20 degrees measured from an axis parallel to a direction of the astigmatism.

8. An ophthalmic lens to be worn on an eye of a patient, comprising: a main body having a toric surface and a spherical surface opposite the toric surface, wherein the spherical surface is configured to exhibit a lens spherical power, wherein the toric surface is configured to exhibit a lens cylindrical power based on at least a direction of astigmatism of the eye of the patient and that is less than a target cylindrical power that would result in substantially full cylindrical correction for said patient, and wherein the lens spherical power is configured such that a minimum circle of the ophthalmic lens is on or adjacent the retina of the eye of the patient at a target angle of alignment.

9. The ophthalmic lens of claim 8, wherein the toric surface is a back surface of the main body configured to be disposed on the eye of the patient.

10. The ophthalmic lens of claim 8, wherein the spherical surface is a back surface of the main body configured to be disposed on the eye of the patient.

11. The ophthalmic lens of claim 8, wherein the target angle of alignment is between 0 and 30 degrees measured from an axis parallel to the direction of the astigmatism.

12. The ophthalmic lens of claim 8, wherein the target angle of alignment is between 10 and 30 degrees measured from an axis parallel to the direction of the astigmatism.

13. The ophthalmic lens of claim 8, wherein the target angle of alignment is between 20 and 30 degrees measured from an axis parallel to the direction of the astigmatism.

14. The ophthalmic lens of claim 8, wherein the target angle of alignment is at least 20 degrees measured from an axis parallel to the direction of the astigmatism.

15. The ophthalmic lens of claim 8, wherein the main body further comprises an eyelid stabilization design structure having a thickness of less than 200 μm.

16. An ophthalmic lens to be worn on an eye of a patient, comprising: a main body having a toric surface and a spherical surface opposite the toric surface, wherein the spherical surface is configured to exhibit a lens spherical power that is different from a target cylinder power that would result in substantially full cylinder correction for said patient, wherein the toric surface is configured to exhibit a lens cylindrical power that; and wherein the lens spherical power is configured such that a minimum circle of the ophthalmic lens is on or adjacent the retina of the eye of the patient at a target angle of alignment.

17. The ophthalmic lens of claim 16, wherein the toric surface is a back surface of the main body configured to be disposed on the eye of the patient.

18. The ophthalmic lens of claim 16, wherein the spherical surface is a back surface of the main body configured to be disposed on the eye of the patient.

19. The ophthalmic lens of claim 16, wherein the target angle of alignment is between 0 and 30 degrees measured from an axis parallel to a direction of the astigmatism.

20. The ophthalmic lens of claim 16, wherein the target angle of alignment is between 10 and 30 degrees measured from an axis parallel to a direction of the astigmatism.

21. The ophthalmic lens of claim 16, wherein the target angle of alignment is between 20 and 30 degrees measured from an axis parallel to a direction of the astigmatism.

22. The ophthalmic lens of claim 16, wherein the target angle of alignment is at least 20 degrees measured from an axis parallel to a direction of the astigmatism.

* * * * *